(12) United States Patent
Kwon et al.

(10) Patent No.: US 8,437,319 B2
(45) Date of Patent: May 7, 2013

(54) WIRELESS NETWORK SYSTEM AND METHOD OF CONFIGURING THE SAME

(75) Inventors: Chang-Yeul Kwon, Yongin-si (KR); Seong-Soo Kim, Seoul (KR); Ji-Sung Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1212 days.

(21) Appl. No.: 12/098,688

(22) Filed: Apr. 7, 2008

(65) Prior Publication Data

US 2008/0247371 A1  Oct. 9, 2008

Related U.S. Application Data

(60) Provisional application No. 60/907,546, filed on Apr. 6, 2007.

(30) Foreign Application Priority Data

Nov. 27, 2007  (KR) .................. 10-2007-0121262

(51) Int. Cl.
*H04W 4/00* (2009.01)
*H04J 1/16* (2006.01)
*H04L 12/28* (2006.01)
*G08C 17/00* (2006.01)
*H04B 7/212* (2006.01)

(52) U.S. Cl.
USPC .......................... 370/338; 370/254; 370/476

(58) Field of Classification Search .................. None
See application file for complete search history.

(56) References Cited

U.S. PATENT DOCUMENTS 6,192,257 B1    2/2001  Ray
7,075,455 B2 *  7/2006  Nishimura et al. ...... 340/870.28
7,796,555 B2 *  9/2010  Jeon et al. .................... 370/331
2006/0251020 A1* 11/2006 Olvera-Hernandez et al. ............................. 370/331
2010/0074097 A1*  3/2010  Jeon et al. .................... 370/217

FOREIGN PATENT DOCUMENTS

KR  1020060082473 A  7/2006
KR  1020070006024 A  1/2007

OTHER PUBLICATIONS

Gupta, Reliable Multicast MAC Protocol for Wireless LANs, 2003, IEEE, pp. 93-97.*
Devinator, Transmit Beamforming with Implicit Feedback, Sep. 19, 2007, CWNP, pp. 1-8.*

* cited by examiner

*Primary Examiner* — Kevin C Harper
*Assistant Examiner* — Samina Choudhry
(74) *Attorney, Agent, or Firm* — Sughrue Mion, PLLC

(57) ABSTRACT

Provided are a wireless network system and a method of configuring the same, in which stations that perform directional communication in a high-frequency band can share information regarding their communication capabilities with each other. An apparatus for managing stations that transmit/receive data using millimeter wave (mmWave) includes a communication capability information management module which receives an association request frame and determines the communication capability of an associating station that has transmitted the association request frame based on the association request frame; an information-frame-generation module which generates a wireless video area network (WVAN) information frame specifying the communication capability of the associating station; and a communication module which transmits the WVAN information frame, wherein the apparatus serves as a wireless network coordinator.

18 Claims, 12 Drawing Sheets

WIRELESS NETWORK SYSTEM AND METHOD OF CONFIGURING THE SAME

CROSS-REFERENCE TO RELATED APPLICATION

This application claims priority from U.S. Provisional Application No. 60/907,546 filed on Apr. 6, 2007 and Korean Patent Application No. 10-2007-0121262 filed on Nov. 27, 2007 in the Korean Intellectual Property Office, the disclosure of which are incorporated herein by reference in their entirety.

BACKGROUND OF THE INVENTION

1. Field of the Invention

System and methods consistent with the present invention relate to a wireless network and configuring the same, and, more particularly, to a wireless network system and a method of configuring the same, in which stations that perform directional communication in a high-frequency band can share information regarding their communication capabilities with each other.

2. Description of the Related Art

As networks become wireless and the demand for large multimedia data transmission increases, there is a need for studies on an effective transmission method in a wireless network environment. In particular, the need for various home devices to wirelessly transmit high-quality videos, such as digital video disk (DVD) images or high definition television (HDTV) images, is growing.

Stations in a network may have different communication capabilities. The transmission of data between stations having different communication capabilities may cause delays and waste of resources.

Therefore, it is desirable to develop a technique that can provide smooth data transmissions between stations by enabling the stations to share information regarding their communication capabilities.

SUMMARY OF THE INVENTION

The present invention provides enabling stations that perform directional communication in a high-frequency band to share information regarding their communication capabilities with each other.

However, the objectives of the present invention are not restricted to the ones set forth herein. The above and other objectives of the present invention will become apparent to one of daily skill in the art to which the present invention pertains by referencing a detailed description of the present invention given below.

According to an aspect of the present invention, there is provided an apparatus for managing stations that transmit/receive data using millimeter wave (mmWave), the apparatus including a communication capability information management module which receives an association request frame and determines the communication capability of an associating station that has transmitted the association request frame based on the association request frame; an information-frame-generation module which generates a wireless video area network (WVAN) information frame specifying the communication capability of the associating station; and a communication module which transmits the WVAN information frame, wherein the apparatus serves as a wireless network coordinator.

According to another aspect of the present invention, there is provided an apparatus for transmitting data using mmWave, the apparatus including a communication capability analysis module which receives a WVAN information frame and analyzes the communication capability of a receiving station based on the WVAN information frame; and a communication module which transmits data to the receiving station according to the result of the analysis performed by the communication capability analysis module.

According to another aspect of the present invention, there is provided a method of managing stations that transmit/receive data using mmWave, the method including receiving an association request frame and determining the communication capability of an associating station that has transmitted the association request frame based on the association request frame; generating a WVAN information frame specifying the communication capability of the associating station; and transmitting the WVAN information frame, wherein the method is performed by a wireless network coordinator.

According to another aspect of the present invention, there is provided a method of transmitting data using mmWave, the method including receiving a WVAN information frame and analyzing the communication capability of a receiving station based on the WVAN information frame; and transmitting data to the receiving station according to the result of the analysis.

BRIEF DESCRIPTION OF THE DRAWINGS

The above and other features of the present invention will become apparent by describing in detail exemplary embodiments thereof with reference to the attached drawings in which.

DETAILED DESCRIPTION OF THE INVENTION

Figure 1:
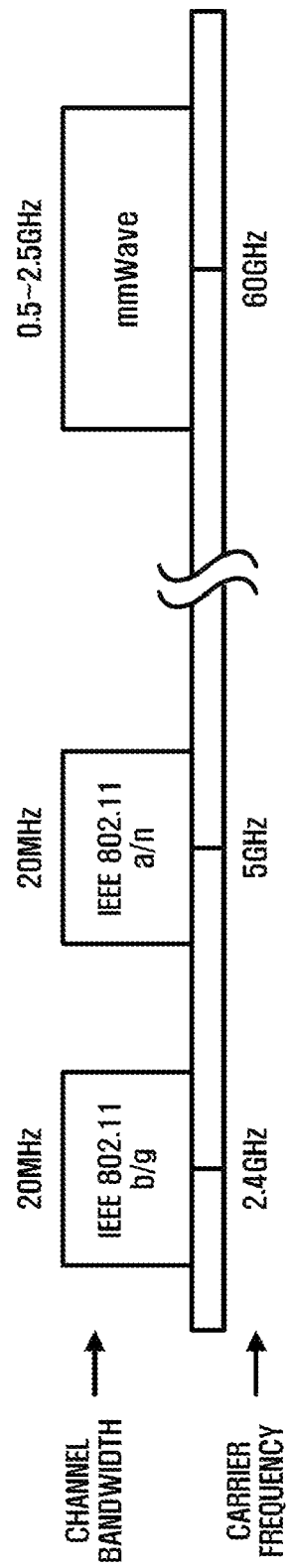
FIG. 1 illustrates a diagram for comparing frequency bands of IEEE 802.11 series of standards and millimeter Wave (mmWave) standard.

The present invention will now be described more fully with reference to the accompanying drawings, in which exemplary embodiments of the invention are shown.

The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

The term "module", as used herein, means, but is not limited to, a software or hardware component, such as a Field Programmable Gate-Array (FPGA) or Application Specific-Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The IEEE 802.15.3c task group is developing a technological standard for transmitting large volumes of data over a wireless home network. The technological standard, which is called "millimeter wave (mmWave)," uses an electromagnetic wave having a physical wavelength of a millimeter (i.e., an electric wave having a frequency band of 30-300 GHz) to transmit large volumes of data. This frequency band, which is an unlicensed band, has conventionally been used by communication service providers or used for limited purposes, such as observing electromagnetic waves or preventing vehicle collision.

FIG. 1 illustrates a diagram for comparing frequency bands of the IEEE 802.11 series of standards and mmWave. Referring to FIG. 1, the IEEE 802.11b or IEEE 802.11g standard uses a carrier frequency of 2.4 GHz and has a channel bandwidth of approximately 20 MHz. In addition, the IEEE 802.11a or IEEE 802.11n standard uses a carrier frequency of 5 GHz and has a channel bandwidth of approximately 20 MHz. In contrast, mmWave uses a carrier frequency of 60 GHz and has a channel bandwidth of approximately 0.5-2.5 GHz. Therefore, it can be understood that mmWave has a far greater carrier frequency and channel bandwidth than the related art the IEEE 802.11 series of standards. When a high-frequency signal (a millimeter wave) having a millimeter wavelength is used, a very high transmission rate of several Gbps can be achieved. Since the size of an antenna can also be reduced to less than 1.5 mm, a single chip which includes the antenna can be implemented. Furthermore, interference between devices can be reduced due to a very high attenuation ratio of the high-frequency signal in the air.

A method of transmitting uncompressed audio or video data (hereinafter, referred to as uncompressed AV data) between wireless devices using a high bandwidth of a millimeter wave has recently been studied. Compressed AV data is generated after lossy compression processes such as motion compensation, discrete cosine transform (DCT), quantization, and variable length coding (VLC) processes. In so doing, components of compressed AV data that human visual and auditory senses are less sensitive to are removed. In contrast, uncompressed AV data includes digital values indicating pixel components (for example, red (R), green (G) and blue (B) components). Since wireless devices transmit/receive uncompressed data, users can be provided with content having a high picture quality and high sound quality.

Figure 2:
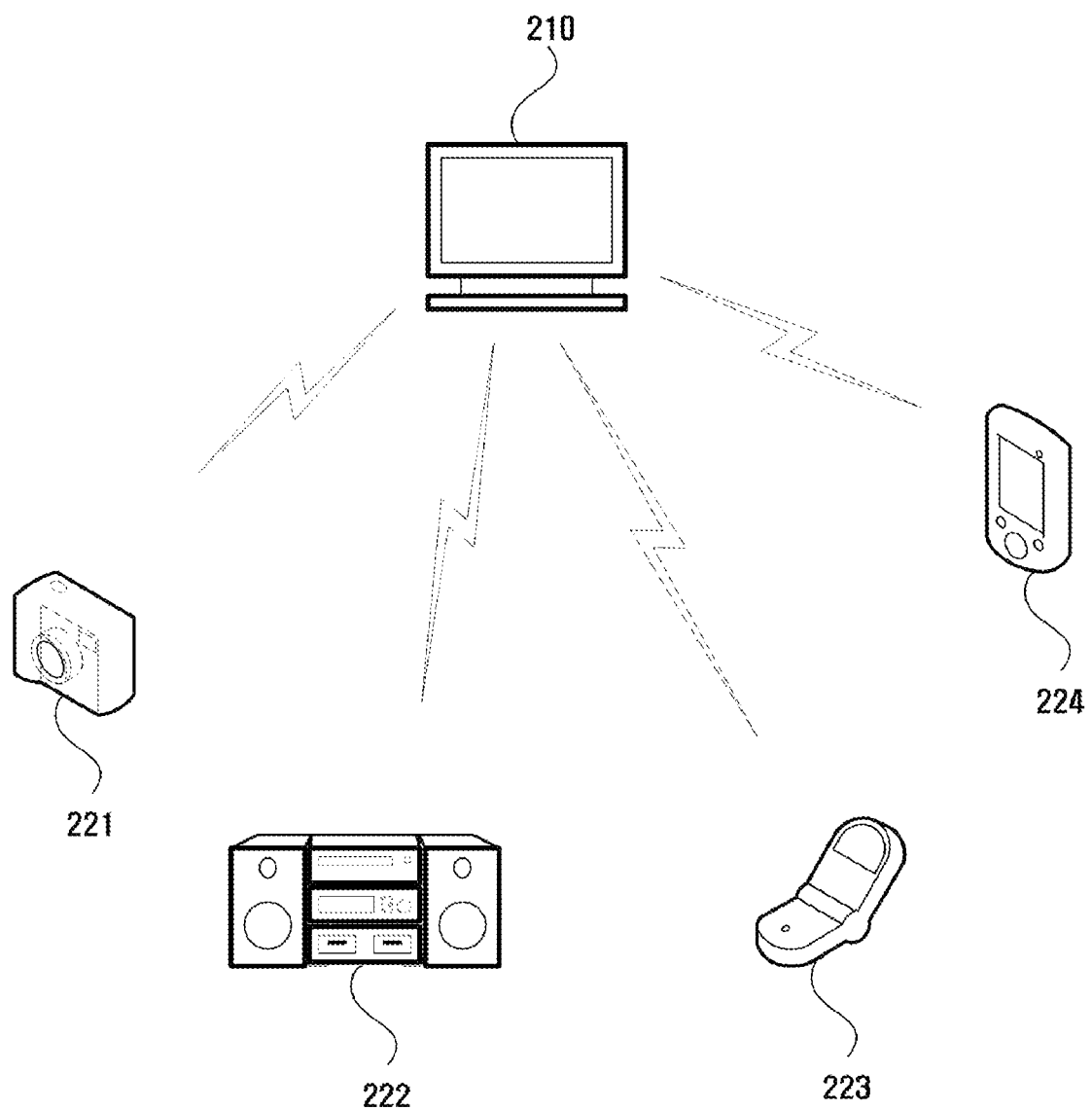
FIG. 2 illustrates a schematic diagram of a wireless network system according to an embodiment of the present invention.

FIG. 2 illustrates a schematic diagram of a wireless network system according to an embodiment of the present invention. Referring to FIG. 2, the wireless network system includes a wireless network coordinator 210 and a plurality of stations 221 through 224.

The wireless network coordinator 210 coordinates bandwidth allocation for the stations 221 through 224 by transmitting a beacon frame. That is, the stations 221 through 224 may receive a beacon frame and wait for a band to be allocated thereto with reference to the received beacon frame. If a band is allocated, the stations 221 through 224 may be able to transmit data to other stations through the band.

A network may be configured using a super frame including at least one channel time block (CTB). A CTB may be classified into either a reserved CTB which is a reserved time period for allocating a band to a certain station in a network or an unreserved CTB, which is a time period for allocating a band to a station that wins the competition with other stations in a network. A CTB is a time period during which data is transmitted between stations in a network and may correspond to a channel time allocation period and a contention access period.

In order to transmit data, a station may compete with other stations during an unreserved CTB. Alternatively, a station may transmit data during a reserved CTB allocated thereto.

According to mmWave technology, in which a carrier frequency of 60 GHz is used and data is transmitted using a channel bandwidth of 0.5 2.5 GHz, it is sometimes required to perform directional communication. That is, data communication may need to be performed by arranging an antenna of a transmitting station and an antenna of a receiving station to face each other. Therefore, beam forming may be performed in order to synchronize the direction of radio waves transmitted by a transmitting station with the direction of radio waves transmitted by a receiving station.

Beam forming may be interpreted as an operation of synchronizing the direction of an antenna of a transmitting station with the direction of an antenna of a receiving station.

A station may be equipped with a single antenna, a switch antenna including more than one antenna or a phased-array antenna including more than one antenna capable of adjusting phase.

A single antenna is an antenna having directivity. The direction of a single antenna cannot be altered.

A switch antenna includes a plurality of antenna having directivity. The directions of antennas of a switch antenna cannot be altered. However, the directions of antennas of a switch antenna may be set to be different from one another, and data may be transmitted only through one selected from the antennas. In this manner, the direction of radio waves transmitted by a switch antenna may be adjusted.

A phased-array antenna, like a switch antenna, includes a plurality of antenna having directivity. The direction of radio waves transmitted by a phased-array antenna may be adjusted by adjusting the phases of antennas of the phased-array antenna.

In order to transmit/receive data in a high-frequency band, phased-array antenna beam forming, which a type of beam forming that can be performed between phased-array antennas, may be performed. Phased-array antenna beam forming, however, involves relatively complicated processes.

If one of a transmitting station and a receiving station is equipped with a phased-array antenna and the other station is equipped with a single antenna, phased-array antenna beam forming may be unnecessary.

Therefore, the communication capabilities of a transmitting station and a receiving station may be determined first, and then, beam forming may be performed in consideration of the communication capabilities of the transmitting station and the receiving station.

Figure 3:
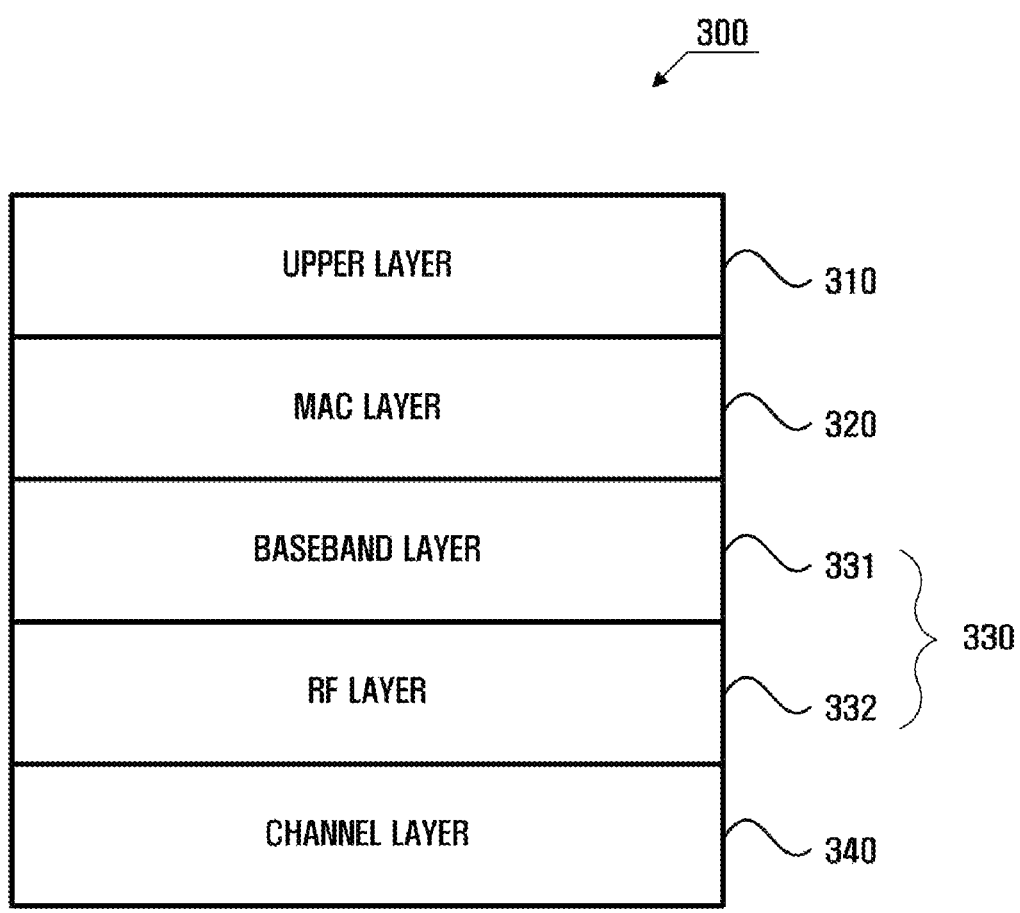
FIG. 3 illustrates a diagram of the structure of a communication layer according to an embodiment of the present invention.

FIG. 3 illustrates a diagram of the structure of a communication layer 300 according to an embodiment of the present invention. Referring to FIG. 3, the communication layer 300 includes a channel layer 340 which is a physical medium having a frequency band through which wireless signals are transmitted; a physical (PHY) layer 330 which includes a radio frequency (RF) layer 332 and a baseband layer 331; a media access control (MAC) layer 320; and an upper layer 310. The upper layer 310, which is a layer above the MAC layer 320, may include a logical link control (LLC) layer, a network layer, a transmission layer and an application layer.

A wireless channel may have a high-frequency band of, for example, 60 GHz, or a low-frequency band of, for example, 2.4 GHz or 5 GHz. Accordingly, the channel layer 340 may enable not only communication with directivity such as uni-directional communication but also communication with no directivity such as omni-directional communication. Beam forming for omni-directional communication may be optional.

Figure 4:
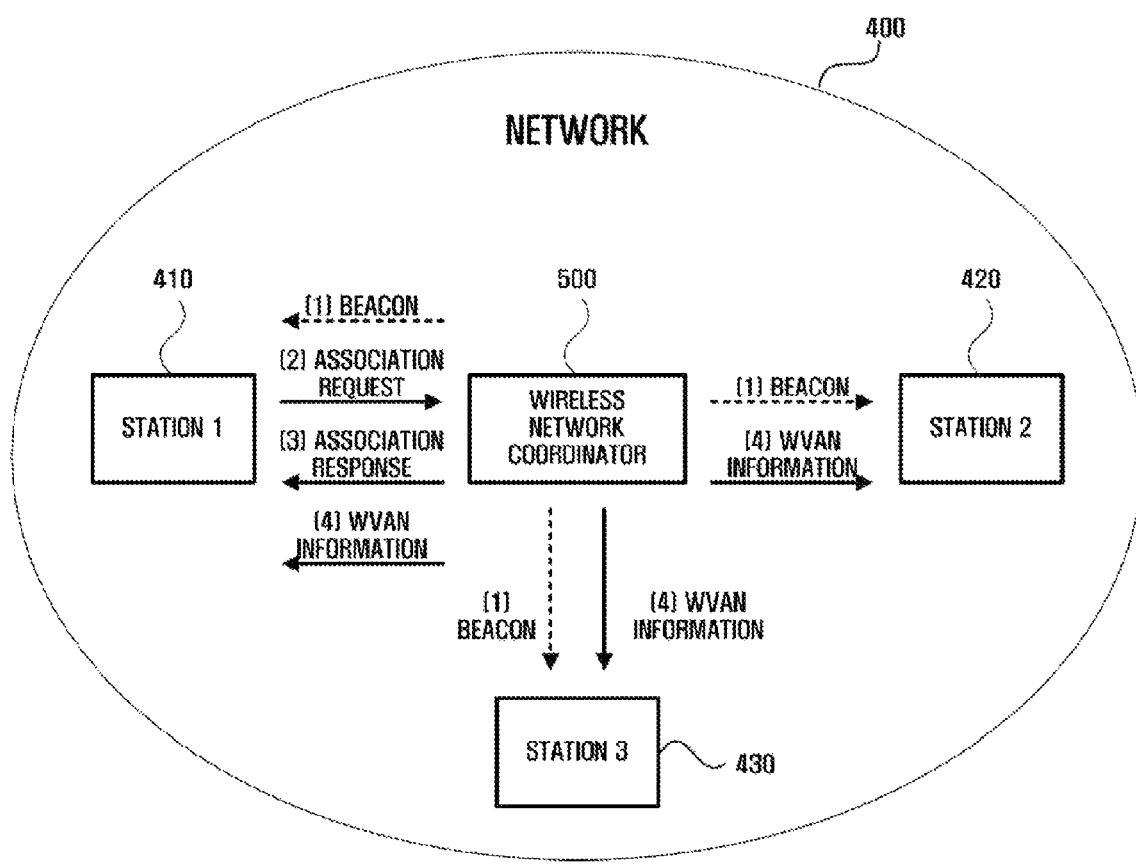
FIG. 4 illustrates a block diagram of a wireless network according to an embodiment of the present invention, and explains the transmission of communication capability information within the wireless network.

FIG. 4 illustrates a block diagram of a wireless network 400 according to an embodiment of the present invention, and explains the transmission of communication capability information within the wireless network 400. Referring to FIG. 4, a wireless network coordinator 500 broadcasts a beacon frame to first, second and third stations 410, 420 and 430 in the wireless network 400. The beacon frame includes the address of the wireless network coordinator 500 and schedule information regarding the transmission/reception of data in the wireless network 400.

A station wishing to participate in the wireless network 400, for example, the first station 410, may transmit an association-request frame to the wireless network coordinator 500 using the address included in the beacon frame. The first station 410 may transmit the association request frame wireless network 400 with reference to the schedule information included in the beacon frame. If the wireless network coordinator 500 does not recognize the existence of the first station 410, the wireless network coordinator 500 may not be able to insert a reserved CTB for the first station 410 into a super frame. Thus, the first station 410 may have to compete with other stations, i.e., the second and third stations 420 and 430, to transmit the association request frame wireless network 400 during an unreserved CTB.

The wireless network coordinator 500 receives the association request frame 1000 (FIG. 10) and transmits an association response frame 1100 (FIG. 11) to the first station 410. The association response frame 1100 may include a message indicating whether the first station 410 in the wireless network 400 is allowed or disallowed to participate in the wireless network 400.

The association request frame 1000 includes information regarding the communication capability of the first station 410. Thus, the wireless network coordinator 500 may update a communication capability list with reference to the association request frame 1000. The communication capability list is a list of information regarding the communication capabilities of all stations currently participating in the wireless network 400. The communication capability list may be updated whenever a new station participates in the wireless network 400 or whenever an existing station leaves the wireless network 400.

The wireless network coordinator 500 generates a wireless video area network (WVAN) information frame 1200 (FIG. 12) specifying the communication capabilities of all the stations currently participating in the wireless network 400 based on the updated communication capability list and distributes the WVAN information frame 1200.

The communication capability of a station may include the capability (hereinafter referred to as "MAC capability") of the station in a MAC layer and the capability (hereinafter referred to as "PHY capability") of the station in a PHY layer. A transmitting station that receives the WVAN information frame 1200 may be able to transmit data to a receiving station using an appropriate method for the communication capability of the receiving station.

The WVAN information frame 1200 may be transmitted upon request or may be transmitted even when not requested. The WVAN information frame 1200 may be transmitted only to a certain station or to all the stations in the wireless network 400.

Figure 5:
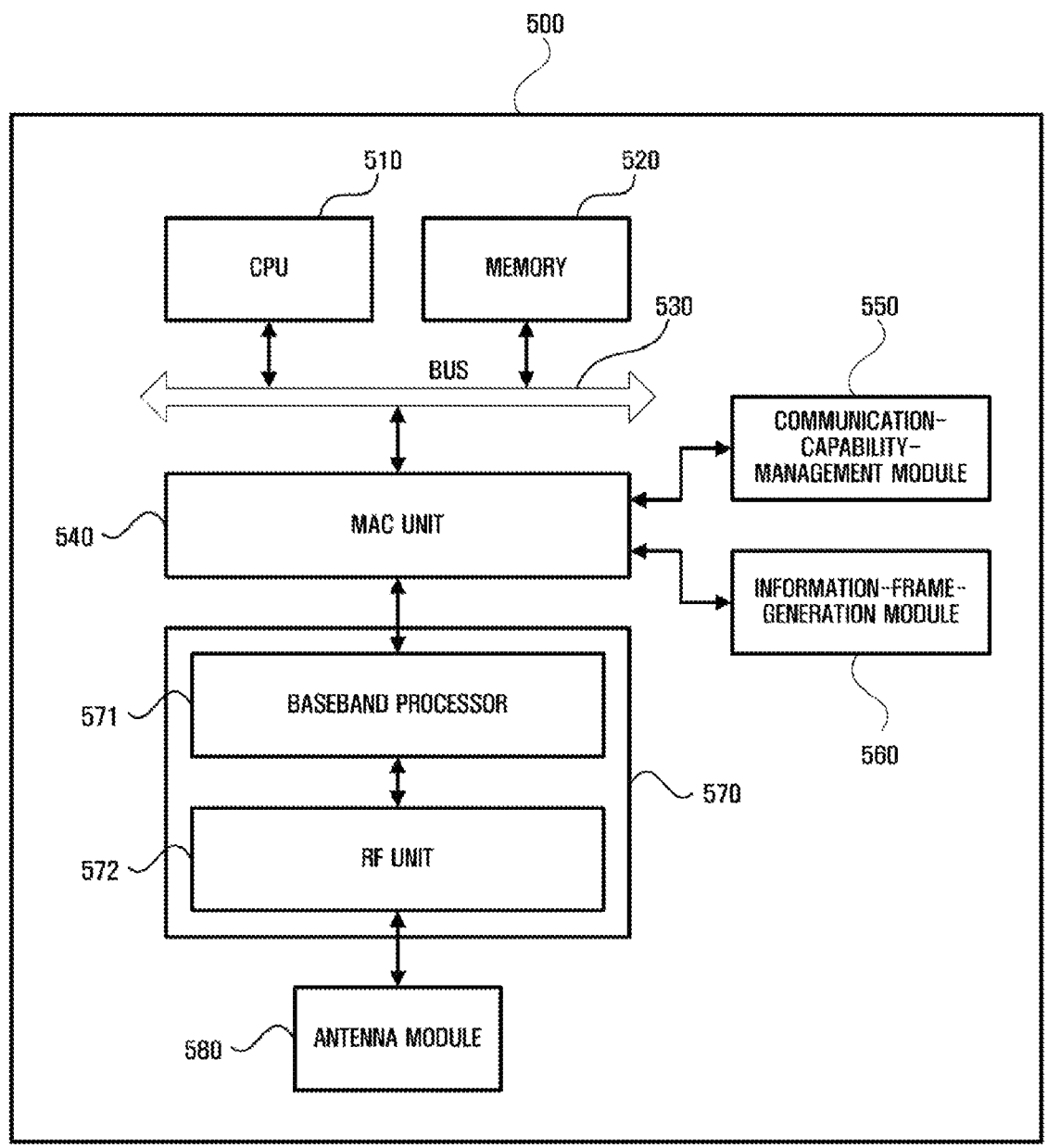
FIG. 5 illustrates a block diagram of a wireless network coordinator according to an embodiment of the present invention.

FIG. 5 illustrates a block diagram of a wireless network coordinator 500 according to an embodiment of the present invention. Referring to FIG. 500, the wireless network coordinator 500 includes a central processing unit (CPU) 510, a memory 520, a MAC unit 540, a communication-capability-management module 550, an information-frame-generation module 560, a communication module 570, and an antenna module 580.

The CPU 510 controls a number of elements of the wireless network coordinator 500, which are all connected to a bus 530. The CPU 510 performs operations of the upper layer 310 of FIG. 3. Specifically, the CPU 510 may received data (i.e., a received MAC service data unit (MSDU)) provided by the MAC unit 540. In addition, the CPU 510 generates data to be transmitted (i.e., an MSDU to be transmitted) and provides the generated data to the MAC unit 540.

The memory 520 stores data, including uncompressed audio/video (A/V) data. Also, the memory 520 may store a communication capability list specifying the communication capabilities of stations in a network. The memory 520 may be a module such as a hard disc, a flash memory, a Compact Flash (CF) card, a Secure Digital (SD) card, a Smart Media (SM) card, a MultiMedia Card (MMC) card or a memory stick to/from which data can be input/output. The memory 520 may be included in wireless network coordinator 500 or in an external device. If the memory 520 is included in an external device, the communication module 570 may perform data transmissions by communicating with the external device.

The MAC unit 540 receives an MSDU to be transmitted from the CPU 510 and adds a MAC header to the MSDU, thereby generating a MAC protocol data unit (MPDU).

The communication module 570 converts the MPDU generated by the MAC unit 540 into a wireless signal and transmits the wireless signal through a communication channel. For this, the communication module 570 may include a baseband processor 571 and an RF unit 572, and may be connected to the antenna module 580. The antenna module 580 may include one or more antennas such as a single antenna, a switch antenna or a phased-array antenna.

The baseband processor 571 adds a signal field and a preamble to the MPDU generated by the MAC unit 540, thereby generating a PHY protocol data unit (PPDU). Then, the RF unit 572 converts the PPDU generated by the baseband processor 571 into a wireless signal and transmits the wireless signal through the antenna module 580.

When a new station participates in a network, the new station transmits an association request frame 1000 to the wireless network coordinator 500. Then, the association request frame 1000 is transmitted to the communication-capability-management module 550.

The communication-capability-management module 550 determines the communication capability of the new station based on the association request frame 1000. Then, the communication-capability-management module 550 updates the communication capability list present in the memory 520 by adding the communication capability of the new station to the corresponding communication capability list.

The information-frame-generation module 560 generates a WVAN information frame 1200 which specifies the communication capability of the new station. The information-frame-generation module 560 can generate a WVAN information frame 1200 specifying the communication capabilities of all the stations in the network.

The communication module 570 transmits the WVAN information frame 1200 generated by the information-frame-generation module 560 through the antenna module 580. Then, the WVAN information frame 1200 is transmitted to all the stations in the network. Therefore, any transmitting station in the network may be able to determine a receiving station in the network and thus to transmit data to the receiving station using an appropriate method for the receiving station.

Figure 6:
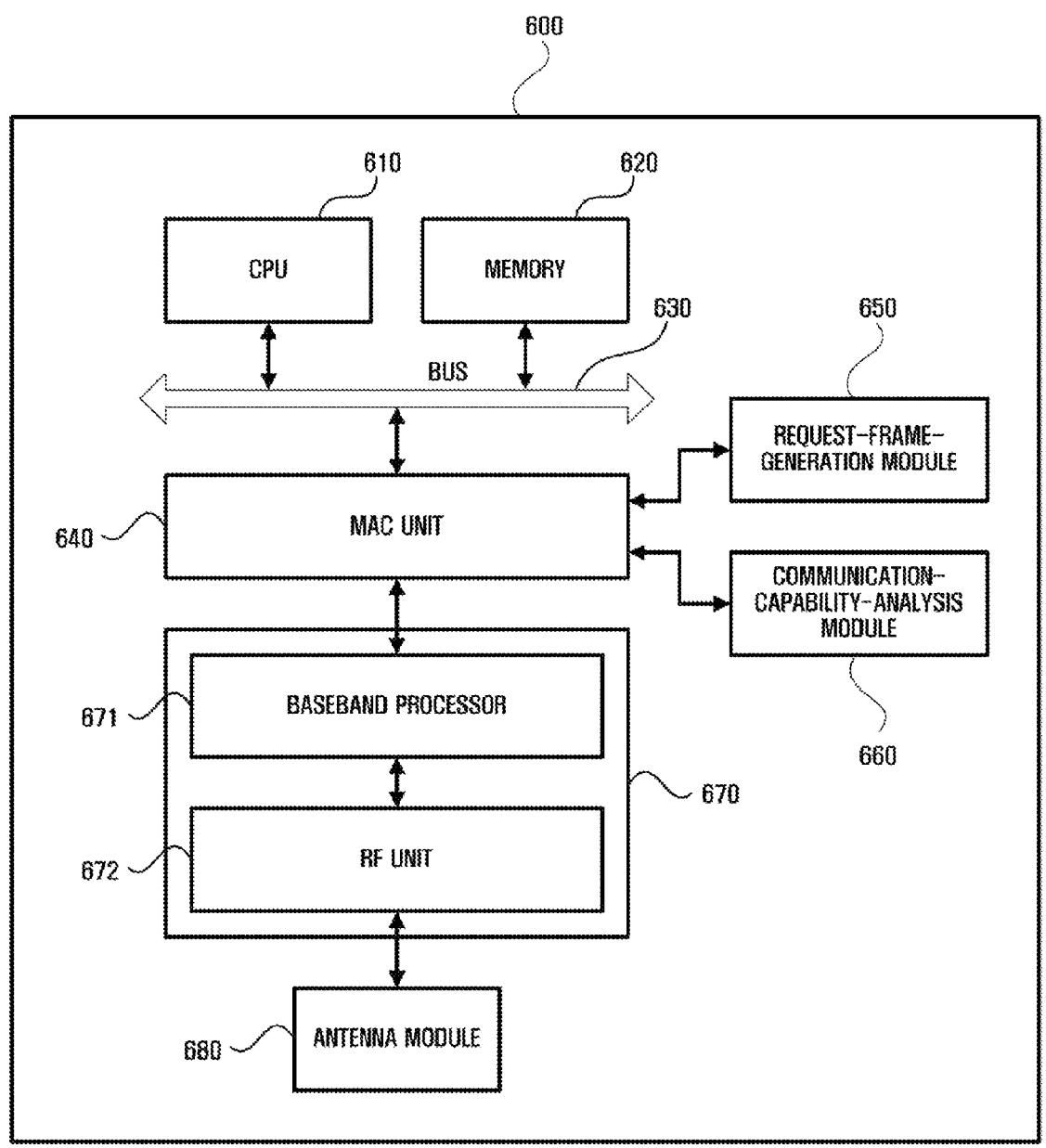
FIG. 6 illustrates a block diagram of a station according to an embodiment of the present invention.

FIG. 6 illustrates a block diagram of a station 600 according to an embodiment of the present invention. Referring to FIG. 6, the station 600 includes a CPU 610, a memory 620, a MAC unit 530, a request frame generation module 650, a communication capability analysis module 660, a communication module 670 and an antenna module 680.

The CPU 610, the memory 620, a bus 630, the MAC unit 640, the communication module 670 and the antenna module 680 are the same as their respective counterparts of the wireless network coordinator 500 illustrated in FIG. 5, and thus detailed descriptions thereof will be skipped.

The station 600 may be classified into an associating station which is a station that wishes to participate in a network or a transmitting station which is a station that wishes to transmit data. If the station 600 is an associating station, the request frame generation module 650 of the station 600 may generate an association request frame 1000. The association request frame 1000 may include MAC capability information such as information indicating whether the station 600 can extend a CTB, information indicating whether the station 600 can reduce a CTB, and information indicating whether the station 600 can perform reliable broadcast or multicast (ReBoM); and PHY capability information such as the type of high-rate PHY (HRP) mode supported by the station 600, the type of beam forming supported by the station 600, the type of antenna of the station 600 and the number of antennas of the station 600.

The communication module 670 transmits the association request frame 1000 generated by the request frame generation module 650 to the wireless network coordinator 500 through the antenna module 680.

The wireless network coordinator 500 receives the association request frame 1000 transmitted by the communication module 670, and transmits an association response frame 1100 to the station 600. If the wireless network coordinator 500 allows the station 600 to participate in the network, the wireless network coordinator 500 may distribute a WVAN information frame 1200 to all the stations in the network.

The WVAN information frame 1200 is received by the communication module 670 through the antenna module 680. Then, the WVAN information frame 1200 is transmitted to the communication capability analysis module 660 of the station 600.

The communication capability analysis module 660 determines the communication capability of a receiving station based on the WVAN information frame 1200. That is, the communication capability analysis module 660 determines the MAC capability and the PHY capability of the receiving station.

The MAC unit 640 and the antenna module 680 perform their operations according to the result of analysis performed by the communication capability analysis module 660. For example, the MAC unit 640 may extend or reduce a CTB or transmit data using a ReBoM method, and the antenna module 680 may perform bean forming in a manner that suits the properties of an antenna module of the receiving station.

Figure 7:
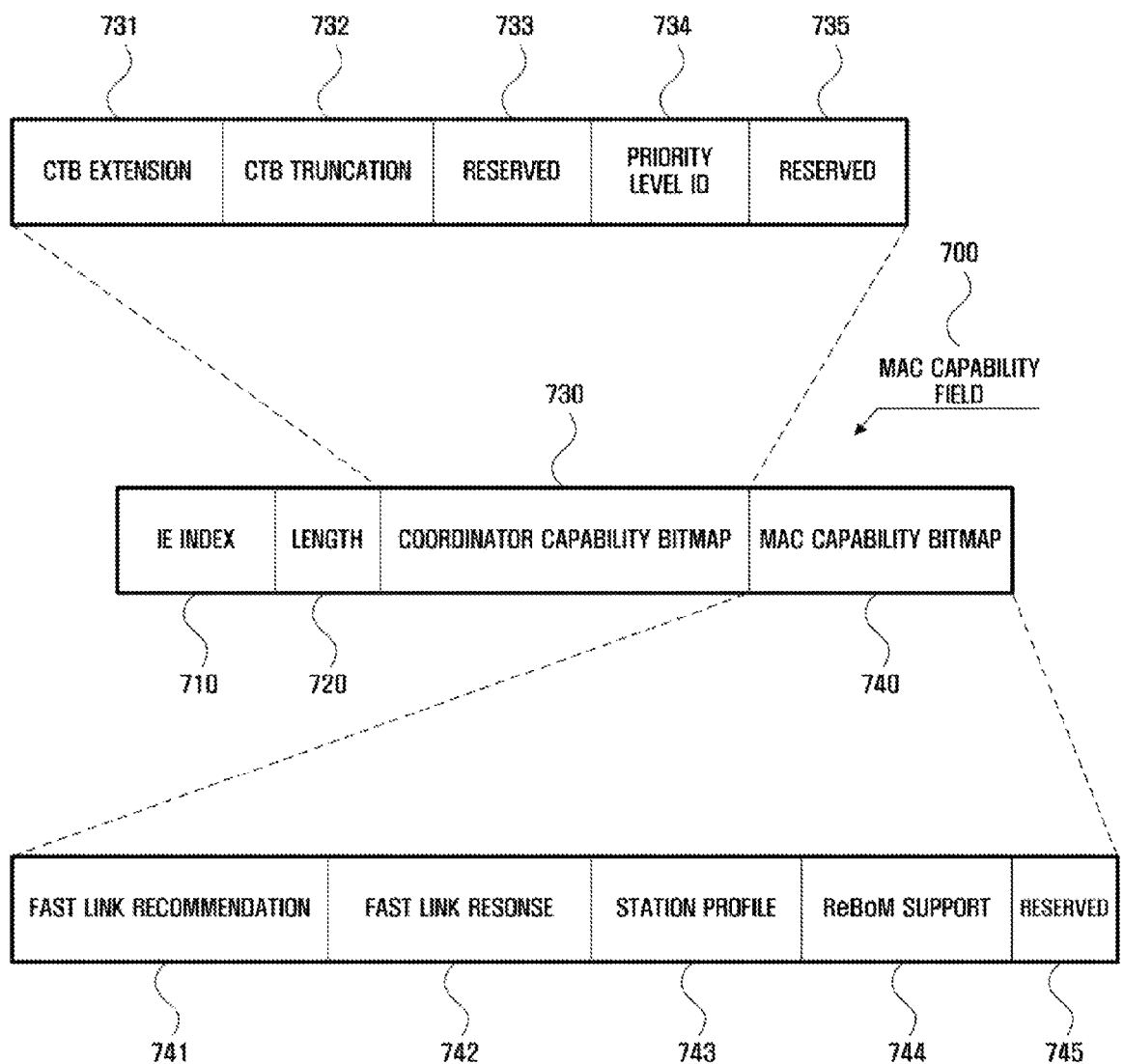
FIG. 7 illustrates a diagram of the structure of a media access control (MAC) capability field according to an embodiment of the present invention.

FIG. 7 illustrates a diagram of the structure of a MAC capability field 700 according to an embodiment of the present invention. Referring to FIG. 7, the MAC capability field 700 includes an IE (Information Element) index field 710, a length field 720, a coordinator capability bitmap field 730, and a MAC capability bitmap field 740.

The IE index field 710 includes an index identifying the MAC capability field 700. The length field 720 specifies the length of the MAC capability field 700.

The coordinator capability bitmap field 730 includes a CTB extension field 731, a CTB truncation field 732, a priority level identifier (ID) field 734 and reserved fields 733 and 735.

The CTB extension field 731 indicates whether a dynamic CTB extension is supported. For example, if the CTB extension field 731 has a value of 1, it may be determined that a dynamic CTB extension is supported by a station. In contrast, if the CTB extension field 731 has a value of 0, it may be determined that a dynamic CTB extension is not supported by the station.

A dynamic CTB extension is the extension of a current CTB for using an unreserved CTB that follows the current CTB, when an additional CTB is required for the purpose of retransmitting data or for other purposes.

A dynamic CTB extension can be supported only when a station performs the functions of the wireless network coordinator 500. During the transmission of data between the wireless network coordinator 500 and a station, the wireless network coordinator 500 may distribute a CTB extension notification command packet.

The CTB truncation field 732 indicates whether a dynamic CTB truncation is supported. For example, if the CTB truncation field 732 has a value of 1, it may be determined that a dynamic CTB truncation is supported by a station. In contrast, if the CTB extension field 731 has a value of 0, it may be determined that a dynamic CTB truncation is not supported by the station.

A dynamic CTB truncation is the conversion of an extra CTB into an unreserved CTB after the transmission of all necessary data.

A dynamic CTB truncation can be supported only when a station performs the functions of the wireless network coordinator 500. During the transmission of data between the wireless network coordinator 500 and a station, the wireless network coordinator 500 may distribute a CTB truncation notification command packet.

The priority level ID field 734 specifies a handover priority level of a station. That is, the priority level ID field 734 specifies a priority level of a station in terms of becoming a wireless network coordinator. The priority level specified in the priority level ID field 734 may vary according to the capability of a station in an application layer such as the state of supply of power to the station and the hardware capability of the station.

The reserved fields 733 and 735 are allocated to the coordinator capability bitmap field 730 for later use for unspecified purposes.

The MAC capability bitmap field 740 of the MAC capability field 700 includes a fast link recommendation field 741, a fast link response field 742, a station profile field 743, a ReBoM support field 744 and a reserved field 745.

The fast link recommendation field 741 indicates whether a station can generate and analyze a fast link recommendation packet format, and the fast link response field 742 indicates whether the station can generate and analyze a fast link response packet format.

The station profile field 743 indicates whether a station is a mobile device. The wireless network coordinator 500 may reference the station profile field 743 to allocate a CTB to a station that is sensitive to the use of power.

The ReBoM support field 744 indicates whether a station supports the use of ReBoM.

The reserved field 745 is allocated to the MAC capability bitmap field 740 for later use for unspecified purposes.

Figure 8:
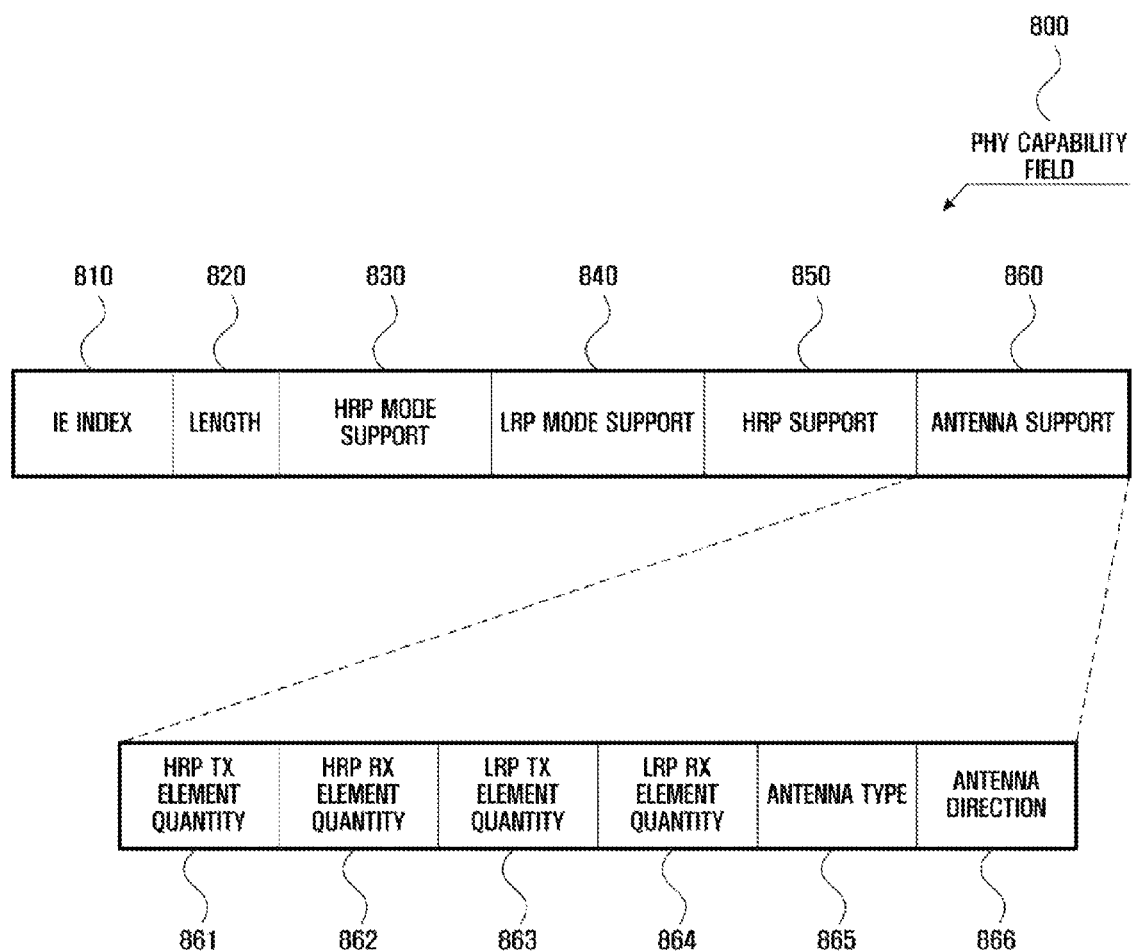
FIG. 8 illustrates a diagram of the structure of a physical (PHY) capability field according to an embodiment of the present invention.

FIG. 8 illustrates a diagram of the structure of a PHY capability field 800 according to an embodiment of the present invention. Referring to FIG. 8, the PHY capability field 800 includes an IE index field 810, a length field 820, an HRP mode support field 830, a low-rate PHY (LRP) mode support field 840, an HRP support field 850, and an antenna support field 860.

The IE index field 810 includes an index that identifies the PHY capability field 800. The length field 820 specifies the length of the PHY capability field 800.

The HRP mode support field 830 specifies an HRP mode supported by a station. An HRP mode may be classified according to a coding mode, a modulation mode, code rate and data rate. If the station does not support any HRP mode, the HRP mode support field 830 may have a value of 0.

The LRP mode support field 840 specifies an LRP mode supported by the station. An LRP mode may be classified according to a modulation mode, forward error correction (FEC) coding rate, data rate and a repetition policy. If the station does not support any LRP mode, the LRP mode support field 840 may have a value of 0.

The HRP support field 850 may include various information necessary for transmitting/receiving data using an HRP method. The structure of the HRP support field 850 will be described later in further detail with reference to FIG. 9.

The antenna support field 860 includes an HRP transmitter (TX) element quantity field 861, an HRP receiver (RX) element quantity field 862, an LRP TX element quantity field 863, an LRP RX element quantity field 864, an antenna type field 865, and an antenna direction field 866.

The HRP TX element quantity field 861 specifies the number of TX elements that are included in the station, that adopt an HRP method and that can be controlled independently. If the station does not include any TX elements that adopt an HRP method and that can be controlled independently, the HRP TX element quantity field 861 may have a value of 0.

The HRP RX element quantity field 862 specifies the number of RX elements that are included in the station, that adopt an HRP method and that can be controlled independently. If the station does not include any RX elements that adopt an HRP method and that can be controlled independently, the HRP RX element quantity field 862 may have a value of 0.

The LRP TX element quantity field 863 specifies the number of TX elements that are included in the station, that adopt an LRP method and that can be controlled independently.

The LRP RX element quantity field 864 specifies the number of RX elements that are included in the station, that adopt an LRP method, and that can be controlled independently.

The antenna type field 865 specifies the type of antenna included in the station.

The antenna direction field 866 specifies the directional capability of an antenna of the station. For example, the antenna direction field 866 may indicate whether an antenna of the station can receive/transmit radio waves belonging to a certain sector from/to a certain direction and whether the antenna of the station can receive/transmit radio waves from/to omni-directions.

Figure 9:
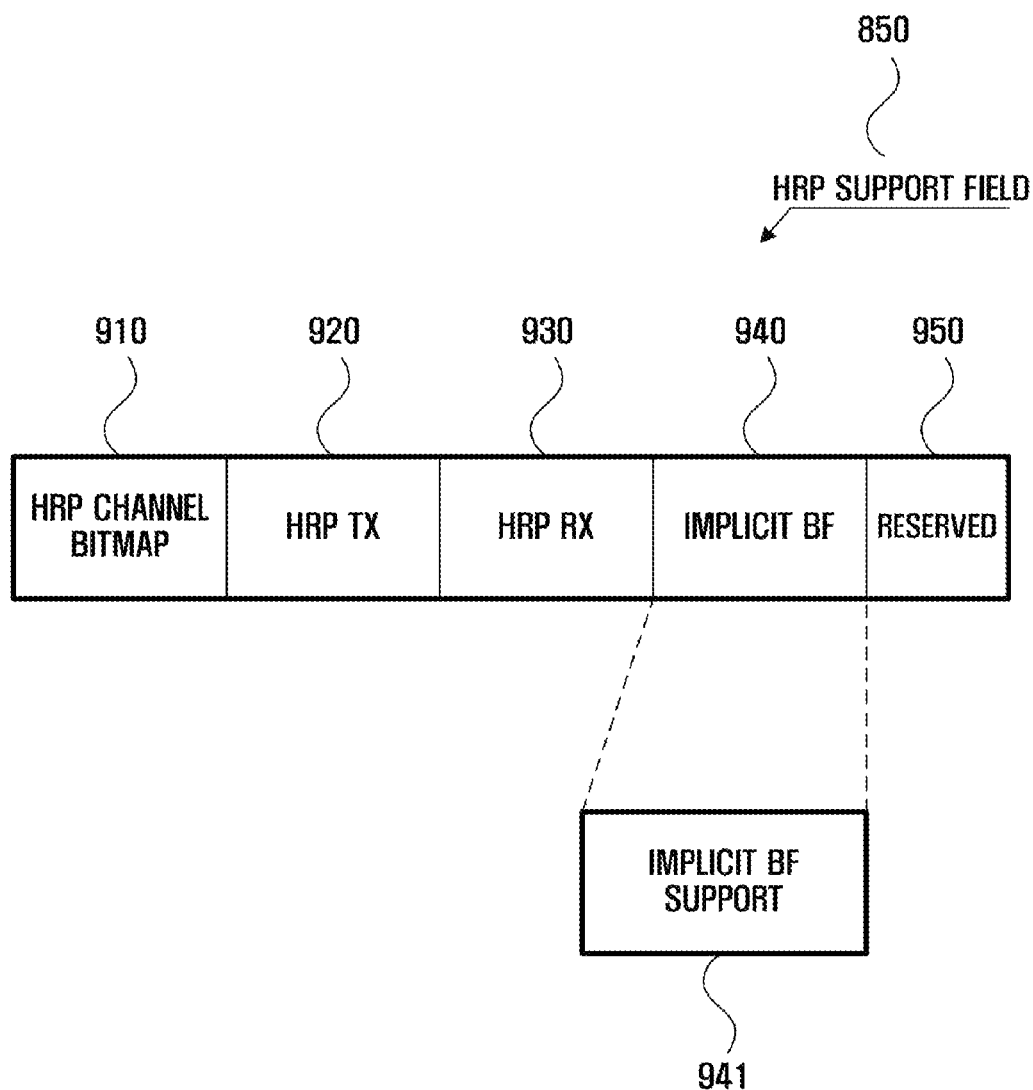
FIG. 9 illustrates a diagram of the structure of a high rate PHY (HRP) support field of the PHY capability field illustrated in FIG. 8.

FIG. 9 illustrates a diagram of the HRP support field 850 of the PHY capability field 800 illustrated in FIG. 8. Referring to FIG. 9, the HRP support field 850 includes an HRP channel bitmap field 910, an HRP TX field 920, an HRP RX field 930, an implicit beam forming (BF) field 940, and a reserved field 950.

The HRP channel bitmap field 910 specifies the type of HRP channel supported by a station. An HRP channel is a frequency channel used in an HRP method. Various HRP channels may be provided according to a start frequency, a center frequency and a pause frequency.

The HRP TX field 920 indicates whether the station supports a data transmission in an HRP mode. The HRP RX field 930 indicates whether the station supports a data reception in an HRP mode.

The implicit BF field 940 indicates whether the station supports implicit BF. Explicit BF, which is a typical BF method, involves the exchange of signals for performing BF during the transmission of data, whereas implicit BF does not involve the exchange of such signals.

The reserved field 950 is allocated for later use for unspecified purposes.

Figure 10:
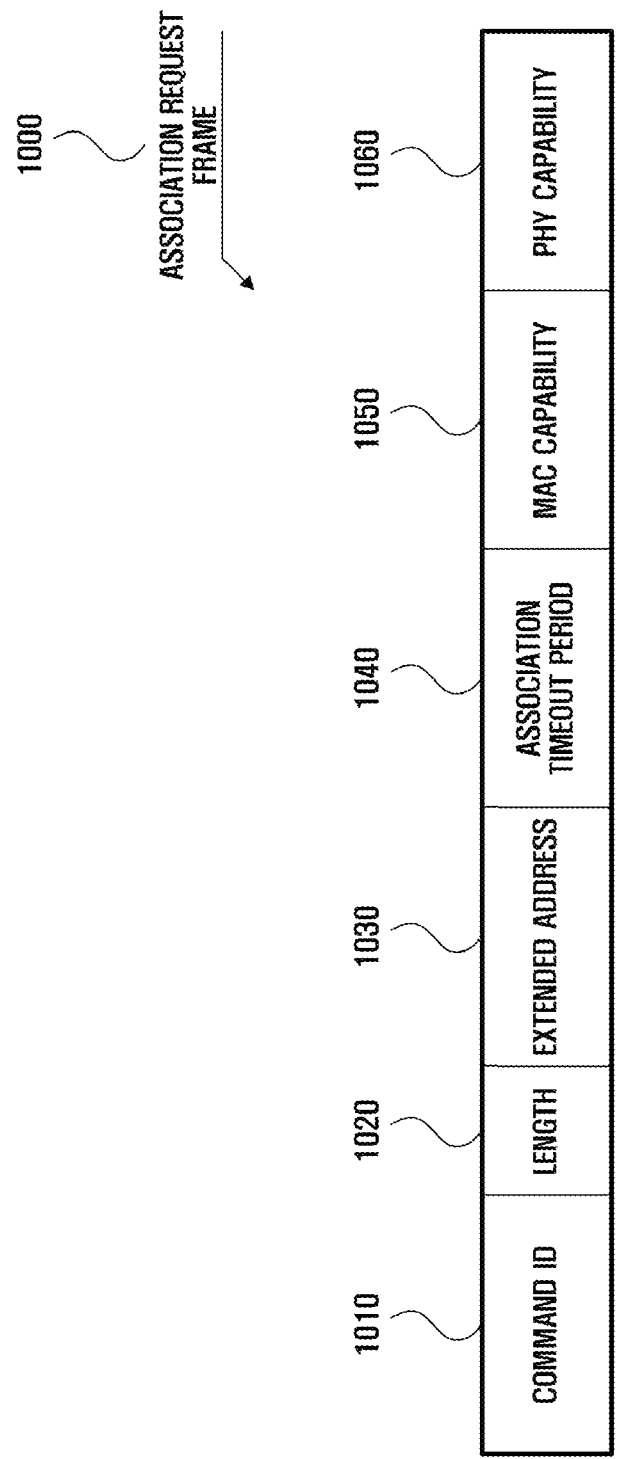
FIG. 10 illustrates a diagram of the structure of an association request frame according to an embodiment of the present invention.

FIG. 10 illustrates a diagram of the structure of an association request frame 1000 according to an embodiment of the present invention. Referring to FIG. 10, the association request frame 1000 includes a command ID field 1010, a length field 1020, an extended address field 1030, an association timeout period field 1040, a MAC capability field 700 and a PHY capability field 800.

The command ID field 1010 includes an index identifying the association request frame 1000. The length field 1020 specifies the length of the association request frame 1000.

The extended address field 1030 specifies an extended MAC address of a station. The extended MAC address specified in the extended address field 1030 may be used to connect a plurality of devices using the same communication method. For example, the extended MAC address specified in the extended address field 1030 may be used to connect a plurality of high-definition multimedia interface (HDMI) devices.

The association timeout period field 1040 specifies a maximum period of time (unit: sec) for which the association between the wireless network coordinator 500 and the station can be maintained without any communication between the wireless network coordinator 500 and the station.

The MAC capability field 700 and the PHY capability field 800 have already been described above with reference to FIG. 7, and thus detailed descriptions thereof will be skipped.

An associating station may notify the wireless network coordinator 500 of the communication capability of the associating station by transmitting the association request frame 1000 to the wireless network coordinator 500.

Figure 11:
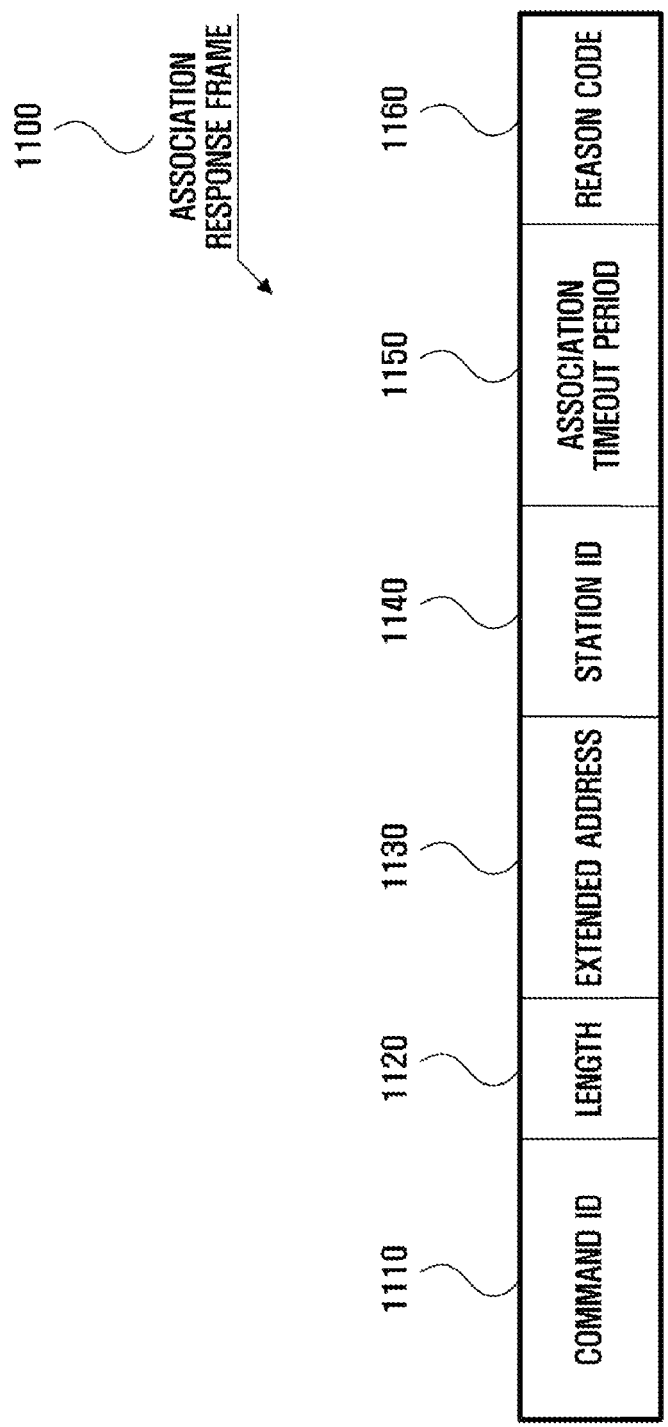
FIG. 11 illustrates a diagram of the structure of an association response frame according to an embodiment of the present invention.

FIG. 11 illustrates a diagram of the structure of an association response frame 1100 according to an embodiment of the present invention. Referring to FIG. 11, the association response frame 1100 includes a command ID field 1110, a length field 1120, an extended address field 1130, a station ID field 1140, an association timeout period field 1150, and a reason code field 1160.

The command ID field 1110 includes an index identifying the association response frame 1100. The length field 1120 specifies the length of the association response frame 1100.

The extended address field 1130, like the extended address field 1030 of FIG. 10, specifies an extended MAC address of a station. The extended address field 1030 has already been described with reference to FIG. 10, and thus a detailed description of the extended address field 1130 will be skipped.

The station ID field 1140 includes an index indicating whether the station has successfully performed association. If the index of the station ID field 1140 indicates that the station has failed to properly perform association, the reasons may be specified in the reason code field 1160.

The association timeout period field 1150 specifies a maximum period of time (unit: sec) for which the association between the wireless network coordinator 500 and the station can be maintained without any communication between the wireless network coordinator 500 and the station.

The reason code field 1160 includes a code indicating the reason why the station cannot participate in a network. For example, if the code of the reason code field 1160 has a value of 1, it may be determined that a maximum number of stations are currently participating in the network. If the code of the reason code field 1160 has a value of 2, it may be determined that an available CTB cannot be allocated to the station. If the code of the reason code field 1160 has a value of 3, it may be determined that a current state of a channel of the station is poor. If the code of the reason code field 1160 has a value of 4, it may be determined that a network has been terminated. If the code of the reason code field 1160 has a value of 5, it may be determined that channels have been changed. If the code of the reason code field 1160 has a value of 6, it may be determined that a wireless network coordinator handover is currently being performed. If the code of the reason code field 1160 has a value of 0, it may be determined that the station is allowed to participate in a network.

Figure 12:
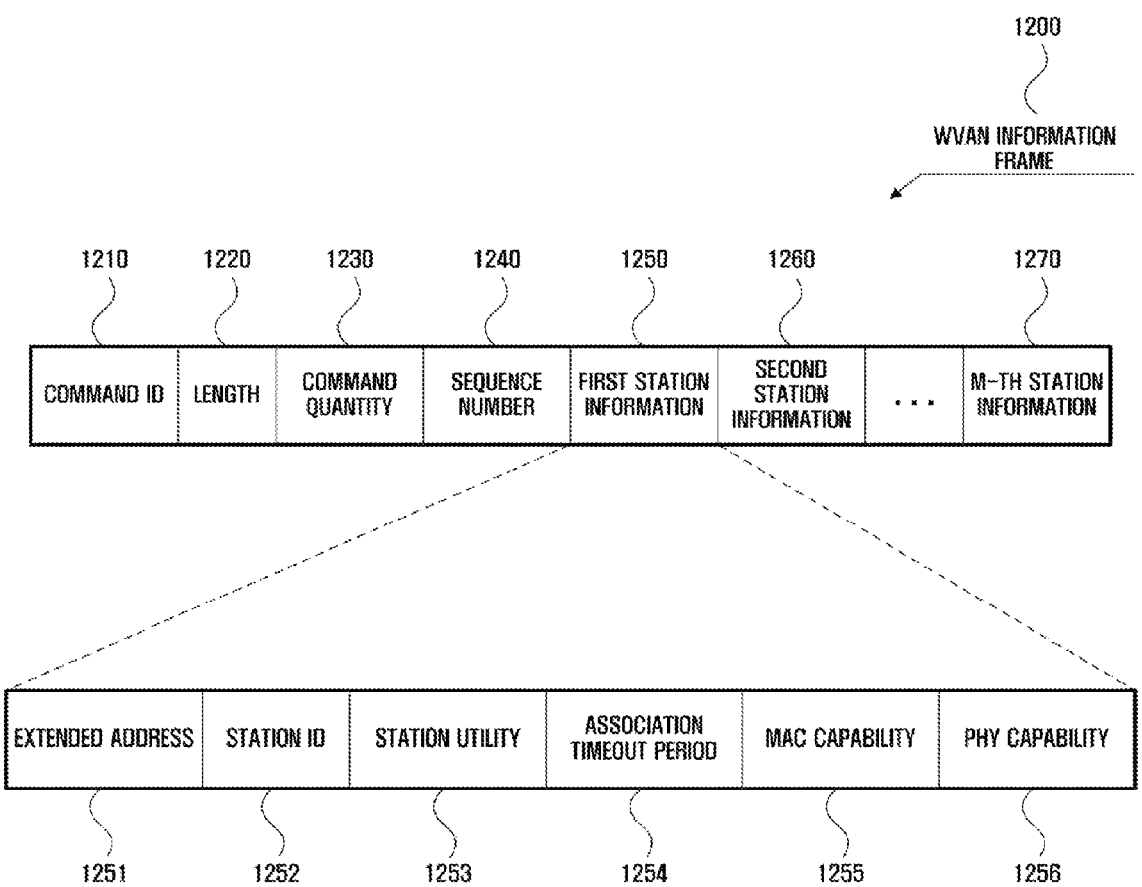
FIG. 12 illustrates a diagram of the structure of a wireless video area network (WVAN) information frame according to an embodiment of the present invention.

FIG. 12 illustrates a diagram of the structure of a WVAN information frame 1200 according to an embodiment of the present invention 1200. Referring to FIG. 12, the WVAN information frame 1200 includes a command ID field 1210, a length field 1220, a command quantity field 1230, a sequence number field 1240 and one or more station information fields 1250, 1260 and 1270.

The command ID field 1210 includes an index identifying the WVAN information frame 1200. The length field 1220 specifies the length of the WVAN information frame 1200.

The command quantity field 1230 specifies the total number of WVAN information frames scheduled to be distributed. The sequence number field 1240 specifies a sequence number of the WVAN information frame 1200, indicating when the WVAN information frame 1200 is to be transmitted. For example, if the WVAN information frame 1200 is the third one of five WVAN information frames, the command quantity field 1230 may have a value of 5, and the sequence number field 1240 may have a value of 3.

Each of the station information fields 1250, 1260 and 1270 may be generated based on a communication capability list.

The station information field 1250 includes an extended address field 1251, a station ID field 1252, a station utility field 1253, an association timeout period field 1254, a MAC capability field 700 and a PHY capability field 800.

The extended address field 1251, like the extended address field 1030 of FIG. 10, specifies an extended MAC address of a station. The extended address field 1030 has already been described with reference to FIG. 10, and thus a detailed description of the extended address field 1251 will be skipped.

The station ID field 1252 includes an index allocated to the station by the wireless network coordinator 500. The station ID field 1252 may not include a broadcast index, an association inability index or a reserved index.

The station utility field 1253 specifies the state of the station. For example, the station utility field 1253 may indicate whether the station has terminated association with a network, whether the station is currently participating in the network and is not secure, or whether the station is currently participating in the network and is secure.

The association timeout period field 1254 specifies a maximum period of time (unit: sec) for which the association between the wireless network coordinator 500 and the station can be maintained without any communication between the wireless network coordinator 500 and the station The MAC capability field 700 and the PHY capability field 800 have already been described above with reference to FIGS. 7 through 9, and thus detailed descriptions thereof will be skipped.

The wireless network coordinator 500 transmits the network information frame 1200 to all stations in a network, and thus allows any transmitting station to transmit data to a receiving station using an appropriate communication method for the communication capability of the receiving station.

As described above, according to the present invention, it is possible to prevent a waste of resources and delays in the transmission of data by allowing devices in a network that perform directional communication using a high-frequency band to share information regarding their communication capabilities.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus, implemented as hardware, for managing a plurality of stations in a wireless network, the apparatus comprising:
   a communication capability information management module which receives an association request frame from a station and determines a communication capability of the station based on the association request frame;
   an information frame generation module which generates a wireless video area network (WVAN) information frame including information on the communication capability of the station; and a communication module, implemented as hardware, which transmits the WVAN information frame to at least one of the plurality of the stations in the wireless network, wherein the apparatus serves as a wireless network coordinator and the station communicates using electromagnetic waves having a wavelength of about a millimeter or having a frequency in a range of 30-300 GHz, wherein the communication capability of the station comprises a media access control (MAC) capability of the station, wherein the WVAN information frame comprises at least one station information field, the at least one station information field comprising a MAC capability field which specifies the MAC capability of the station, and wherein the MAC capability field comprises a channel time block (CTB) extension field which indicates whether the station supports a dynamic CTB extension.

2. The apparatus of claim 1, wherein the communication capability of the station further comprises physical (PHY) capability of the station.

3. The apparatus of claim 2, wherein the at least one station information field further comprises a PHY capability field which specifies the PHY capability of the station.

4. The apparatus of claim 3, wherein the MAC capability field further comprises:
   a CTB truncation field which indicates whether the station supports a dynamic CTB truncation;
   a fast link recommendation field which indicates whether the station can generate and analyze a fast link recommendation packet format;
   a fast link response field which indicates whether the station can generate and analyze a fast link response packet format; and
   a reliable broadcast or multicast (ReBoM) support field which indicates whether the station supports a use of ReBoM.

5. The apparatus of claim 3, wherein the PHY capability field comprises at least one of:
   an implicit beam forming (BF) support field which indicates whether the station supports implicit BF;
   a high-rate PHY (HRP) transmitter (TX) element quantity field which indicates a number of HRP TX elements of the station that can be controlled independently;
   an HRP receiver (RX) element quantity field which indicates a number of HRP RX elements of the station that can be controlled independently;
   a low-rate PHY (LRP) TX element quantity field which indicates a number of LRP TX elements of the station that can be controlled independently;
   an LRP RX element quantity field which indicates a number of LRP RX elements of the station that can be controlled independently;
   an antenna type field which indicates a type of antenna of the station; and
   an antenna direction field which indicates a directional capability of the antenna of the station.

6. An apparatus, implemented as hardware, for transmitting data to a station in a wireless network using mmWave, the apparatus comprising:
   a communication capability analysis module which receives a wireless video area network (WVAN) information frame from a coordinator in the wireless network and analyzes, in an analysis, a communication capability of a station based on the WVAN information frame; and a communication module, implemented as hardware, which transmits data to the station according to a result of the analysis performed by the communication capability analysis module, wherein the WVAN information frame is generated based on an association request frame that has been transmitted to the station, wherein the association request frame comprises a MAC capability field which specifies a MAC capability of the station, and wherein the MAC capability field comprises a channel time block (CTB) extension field which indicates whether the station supports a dynamic CTB extension.

7. The apparatus of claim 6, wherein the association request frame further comprises a PHY capability field which specifies a PHY capability of the station.

8. The apparatus of claim 6, wherein the communication module transmits the data using a channel bandwidth of 0.5-2.5 GHz.

9. The apparatus of claim 6, wherein the data comprises uncompressed audio/video (A/V) data.

10. A method of managing a plurality of stations in a wireless network that transmit/receive, the method comprising:
   receiving an association request frame and determining a communication capability of a station that has transmitted the association request frame, based on the association request frame;
   generating a wireless video area network (WVAN) information frame specifying the communication capability of the station; and
   transmitting the WVAN information frame to at least one of the plurality of the stations in the wireless network,
   wherein the method is performed by a wireless network coordinator and the station communicates using electromagnetic waves having a wavelength of about a millimeter or having a frequency in a range of 30-300 GHz,
   wherein the communication capability of the station comprises a media access control (MAC) capability of the station,
   wherein the WVAN information frame comprises at least one station information field, the at least one station information field comprising a MAC capability field which specifies the MAC capability of the station,
   and wherein the MAC capability field comprises a channel time block (CTB) extension field which indicates whether the station supports a dynamic CTB extension.

11. The method of claim 10, wherein the communication capability of the station further comprises a PHY capability of the station.

12. The method of claim 10, wherein the at least one station information field further comprises a PHY capability field which specifies a PHY capability of the station.

13. The method of claim 12, wherein the MAC capability field further comprises:
   a CTB truncation field which indicates whether the station supports a dynamic CTB truncation;
   a fast link recommendation field which indicates whether the station can generate and analyze a fast link recommendation packet format;
   a fast link response field which indicates whether the station can generate and analyze a fast link response packet format; and
   a reliable broadcast or multicast (ReBoM) support field which indicates whether the station supports a use of ReBoM.

14. The method of claim 12, wherein the PHY capability field comprises at least one of:
- an implicit BF support field which indicates whether the station supports implicit BF;
- a high-rate PHY (HRP) transmitter (TX) element quantity field which indicates a number of HRP TX elements of the station that can be controlled independently;
- an HRP receiver (RX) element quantity field which indicates a number of HRP RX elements of the station that can be controlled independently;
- a low-rate PHY (LRP) TX element quantity field which indicates a number of LRP TX elements of the station that can be controlled independently;
- an LRP RX element quantity field which indicates a number of LRP RX elements of the station that can be controlled independently;
- an antenna type field which indicates a type of antenna of the station; and
- an antenna direction field which indicates a directional capability of the antenna of the station.

15. A method of transmitting data using mmWave to a station in a wireless network, the method comprising:
- receiving a wireless video area network (WVAN) information frame from a coordinator of the wireless network and analyzing, in an analysis, a communication capability of a station based on the WVAN information frame; and
- transmitting data to the station according to a result of the analysis,
- wherein the WVAN information frame is generated based on an association request frame that has been transmitted to the station,
- wherein the association request frame comprises a MAC capability field which specifies a MAC capability of the station,
- and wherein the MAC capability field comprises a channel time block (CTB) extension field which indicates whether the station supports a dynamic CTB extension.

16. The method of claim 15, wherein the association request frame further comprises
- a PHY capability field which specifies a PHY capability of the station.

17. The method of claim 15, wherein the transmitting of the data comprises transmitting the data using a channel bandwidth of 0.5-2.5 GHz.

18. The method of claim 15, wherein the data comprises uncompressed A/V data.

* * * * *